United States Patent
Lee

(10) Patent No.: US 10,572,398 B2
(45) Date of Patent: Feb. 25, 2020

(54) USB MULTI-HOST DEVICE, VEHICLE INCLUDING THE USB MULTI-HOST DEVICE AND METHOD FOR CONTROLLING THE USB MULTI-HOST DEVICE

(71) Applicant: HYUNDAI MOTOR COMPANY, Seoul (KR)

(72) Inventor: Seung-Cheol Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 15/380,258

(22) Filed: Dec. 15, 2016

(65) Prior Publication Data
US 2017/0293576 A1  Oct. 12, 2017

(30) Foreign Application Priority Data
Apr. 12, 2016  (KR) .................. 10-2016-0044549

(51) Int. Cl.
| G06F 13/10 | (2006.01) |
| G06F 13/20 | (2006.01) |
| G06F 13/40 | (2006.01) |
| G06F 13/42 | (2006.01) |
| H04L 29/08 | (2006.01) |

(52) U.S. Cl.
CPC ............ *G06F 13/102* (2013.01); *G06F 13/20* (2013.01); *G06F 13/4068* (2013.01); *G06F 13/4282* (2013.01); *G06F 2213/0042* (2013.01); *H04L 67/12* (2013.01)

(58) Field of Classification Search
CPC .... G06F 13/102; G06F 13/20; G06F 13/4068; G06F 13/4282

USPC .......................................................... 710/11
See application file for complete search history.

(56) References Cited

U.S. PATENT DOCUMENTS

| 6,389,029 B1 * | 5/2002 | McAlear ................. H04L 12/46 370/402 |
| 6,532,512 B1 * | 3/2003 | Torii ................... G06F 13/4022 710/316 |
| 6,675,250 B1 * | 1/2004 | Ditner ................. G06F 11/2033 370/364 |

(Continued)

FOREIGN PATENT DOCUMENTS

| JP | 2011248662 A | 12/2011 |
| KR | 10-2008-0102355 A | 11/2008 |

(Continued)

OTHER PUBLICATIONS

Universal Serial Bus 3.0 Specification Revision 1.0 Nov. 12, 2008 (Year: 2008).*

(Continued)

*Primary Examiner* — Paul R. Myers
(74) *Attorney, Agent, or Firm* — Morgan, Lewis & Bockius LLP

(57) ABSTRACT

A universal serial bus (USB) multi-host device includes a plurality of upstream ports connected to a first host and a second host, a storage for storing data to be transmitted from the first host to the second host through the upstream ports, and a controller, and if the storage receives the data, the controller transmitting a signal based on the received data to the second host, and transmitting the stored data to the second host.

15 Claims, 12 Drawing Sheets

(56) References Cited

U.S. PATENT DOCUMENTS

| | | | |
|---|---|---|---|
| 7,502,878 B1* | 3/2009 | Wright | G06F 13/4022 710/37 |
| 7,769,941 B2* | 8/2010 | Huang | H04L 49/101 710/313 |
| 7,970,976 B2* | 6/2011 | Ulmer | G06F 13/4022 710/106 |
| 8,352,668 B2* | 1/2013 | Yan | G06F 13/4022 710/316 |
| 8,447,890 B1 | 5/2013 | LeTourneur et al. | |
| 9,460,037 B2* | 10/2016 | Voto | G06F 13/4282 |
| 9,619,420 B2* | 4/2017 | Voto | G06F 13/4022 |
| 2003/0043771 A1* | 3/2003 | Mizutani | H04W 76/10 370/338 |
| 2004/0019732 A1* | 1/2004 | Overtoom | G06F 13/4022 710/313 |
| 2005/0033880 A1 | 2/2005 | Lin | |
| 2005/0060490 A1* | 3/2005 | Lu | G06F 13/4081 711/115 |
| 2005/0091437 A1 | 4/2005 | Yang et al. | |
| 2006/0206650 A1 | 9/2006 | Chang | |
| 2007/0245057 A1* | 10/2007 | Bohm | G06F 13/385 710/313 |
| 2008/0005262 A1* | 1/2008 | Wurzburg | G06F 13/4022 709/217 |
| 2008/0057775 A1* | 3/2008 | Lin | H01R 31/065 439/378 |
| 2009/0268743 A1 | 10/2009 | Chang et al. | |

FOREIGN PATENT DOCUMENTS

| | | |
|---|---|---|
| KR | 10-2014-0110623 | 9/2014 |
| WO | 2015/047945 A1 | 4/2015 |

OTHER PUBLICATIONS

On-The-Go Supplement to the USB 2.0 Specification Revision 1.0 Dec. 18, 2001 (Year: 2001).*

Notice of Allowance issued in Korean Patent Application No. 10-2016-0044549, dated Jan. 30, 2018 (English translation).

* cited by examiner

USB MULTI-HOST DEVICE, VEHICLE INCLUDING THE USB MULTI-HOST DEVICE AND METHOD FOR CONTROLLING THE USB MULTI-HOST DEVICE

CROSS-REFERENCE TO RELATED APPLICATION

This application claims the benefit of priority to Korean Patent Application No. 10-2016-0044549, filed on Apr. 12, 2016 with the Korean Intellectual Property Office, the disclosure of which is incorporated herein by reference.

TECHNICAL FIELD

Embodiments of the present disclosure relate to a Universal Serial Bus (USB) multi-host device, a vehicle including the USB multi-host device, and a method for controlling the multi-host device, and more particularly to a USB communication method.

BACKGROUND

A Universal Serial Bus (USB) is a port and communication protocol available in computers and various electronic devices based on the same interfacing method, such that the USB allows data to be easily transferred between computers and electronic devices designed to use the USB over the same type of port, generally called a USB port.

USB allows coupling of peripheral devices to a computer system, and is a serial cable bus that supports data exchange between a host computer and a wide range of simultaneously accessible devices.

The bus allows peripherals to be attached, configured, used, and detached while the host computer is in operation. For example, USB printers, scanners, digital cameras, storage devices, card readers etc. may communicate with a host system over USB.

A communication method for USB is a master-slave asymmetrical communication method. In this case, although a master device acting as a host device may have high implementation complexity, a slave device may be simplified in structure. In addition, a plurality of slave devices may be connected to a single host device according to the USB communication method, and, as such, the above-mentioned USB communication method has been widely used in personal computers (PCs) and other computer systems throughout the world.

An asymmetrical multiplex communication method for USB has been designed to allow only one host to communicate with a slave, such that it is difficult for two or more hosts to be multiplexed with a plurality of slaves according to the asymmetrical multiplexing communication method for USB.

In addition, since the present USB standard specification is unable to support such communication, plural USB ports need to be physically installed for connection of plural hosts.

SUMMARY

Therefore, it is an aspect of the present disclosure to provide a USB multi-host device configured to execute a conversion function by software so as to support On the Go (OTG) in which a plurality of hosts may communicate with each other according to the USB communication standard, such that hardware complexity of a host system is reduced and high-priced cables and complicated connections contained in a vehicle or the like are also reduced in number, as well as to provide a vehicle including the USB multi-host device, and a method for controlling the USB multi-host device.

Additional aspects of the disclosure will be set forth in part in the description which follows and, in part, will be obvious from the description, or may be learned by practice of the disclosure.

In accordance with an aspect of the present disclosure, a universal serial bus (USB) multi-host device is provided. The device may include a plurality of upstream ports connected to a first host and a second host; a storage for storing data to be transmitted from the first host to the second host through the upstream ports; and a controller, and if the storage receives the data, the controller transmitting a signal based on the received data to the second host, and transmitting the stored data to the second host.

If there is a plurality of hosts, the controller may determine a host scheduled to transmit the data on the basis of the received data.

The controller may transmit a predefined packet in such a manner that each of the first host and the second host recognizes the controller as a logical network device.

The controller may allow the first host to transmit the data to the storage through an OUT Bulk end point.

The controller may transmit a signal based on data to be transmitted to the second host through an IN Interrupt end point.

If the data is transmitted to the second host, the controller may transmit the data to the second host through the IN Bulk end point.

In accordance with another aspect of the present disclosure, a vehicle is provided. The device, or vehicle, may include, a plurality of upstream ports connected to a first host and a second host; a storage for storing data to be transmitted from the first host to the second host through the upstream ports; and a controller, and if the storage receives the data, the controller transmitting a signal based on the received data to the second host, and transmitting the stored data to the second host.

If there is a plurality of hosts, the controller may determine a host scheduled to transmit the data on the basis of the received data.

The controller may transmit a predefined packet in such a manner that each of the first host and the second host recognizes the controller as a logical network device.

The controller may allow the first host to transmit the data to the storage through an OUT Bulk end point.

The controller may transmit a signal based on data to be transmitted to the second host through an IN Interrupt end point.

If the data is transmitted to the second host, the controller may transmit the data to the second host through the IN Bulk end point.

In accordance with another aspect of the present disclosure, a method for controlling a universal serial bus (USB) multi-host device is provided. The method may include storing data to be transmitted from a first host to a second host; transmitting a signal based on the transmitted data to the second host; and transferring the stored data to the second host.

The method may further include, If there is a plurality of hosts, determining a host scheduled to transmit the data on the basis of the data.

The step of transmitting the signal based on the transmitted data to the second host may include transmitting a predefined packet to the first host and the second host.

The step of transferring the stored data to the second host may include transmitting, by the first host, the data through an OUT Bulk end point.

The step of transmitting the signal based on the transmitted data to the second host may include transmitting a signal based on data to be transmitted to the second host through an IN Interrupt end point.

The step of transferring the stored data to the second host may include, if the data is transmitted to the second host, transmitting the data through the IN Bulk end point.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
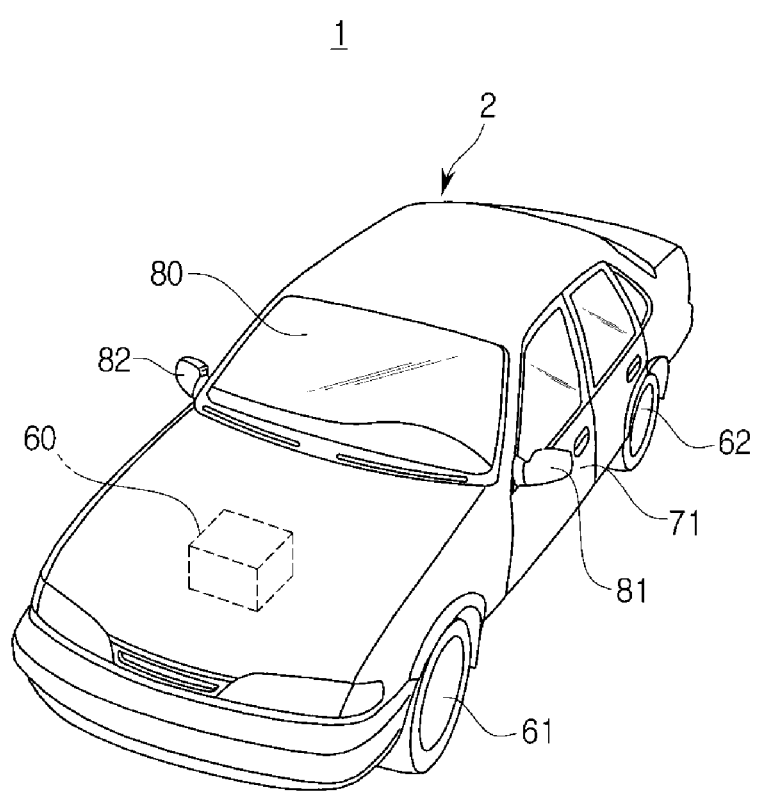
FIG. 1 is a view illustrating an exterior of a vehicle according to an embodiment of the present disclosure.

Reference will now be made in detail to the embodiments of the present disclosure, examples of which are illustrated in the accompanying drawings, wherein like reference numerals refer to like elements throughout. A USB multi-host device, a vehicle including the same, and a method for controlling the USB multi-host device according to embodiments of the present disclosure will hereinafter be described with reference to the attached drawings.

FIG. 1 is a view illustrating an appearance of a vehicle according to an embodiment of the present disclosure.

Referring to FIG. 1, the vehicle 1 according to the embodiment may include a main body 2 forming an appearance of the vehicle 1, vehicle wheels (61, 62) to move the vehicle 1 from place to place, a drive unit 60 to rotate the vehicle wheels (61, 62), doors 71 to shield an indoor space of the vehicle 1 from the outside, a vehicle windshield 80 to provide a forward view of the vehicle 1 to a vehicle driver who rides in the vehicle and side-view mirrors (81, 82) to provide a rear view of the vehicle 1 to the vehicle driver.

The wheels (61, 62) may include front wheels 61 provided at the front of the vehicle 1 and rear wheels 62 provided at the rear of the vehicle 1. The drive unit 60 may provide a rotational force to the front wheels 61 or the rear wheels 62 in a manner that the main body 2 moves forward or backward. The drive unit 60 may include an engine to generate a rotational force by burning fossil fuels or a motor to generate rotational force upon receiving power from a condenser (not shown).

The doors 71 are rotatably provided at the right and left sides of the main body 2 so that a vehicle driver rides in the vehicle 1 when any of the doors 71 is open and an indoor space of the vehicle 1 may be shielded from the outside when the doors 71 are closed.

The windshield 80 is provided at a front upper portion of the main body 2 so that a vehicle driver who rides in the vehicle obtains visual information of a forward direction of the vehicle 1.

The side-view mirrors (81, 82) may include a left side-view mirror 81 provided at the left of the main body 2 and a right side-view mirror 82 provided at the right of the main body 2, so that the driver who rides in the vehicle 1 may obtain visual information of the lateral and rear directions of the vehicle 1 through the side-view mirrors (81, 82).

Figure 2:
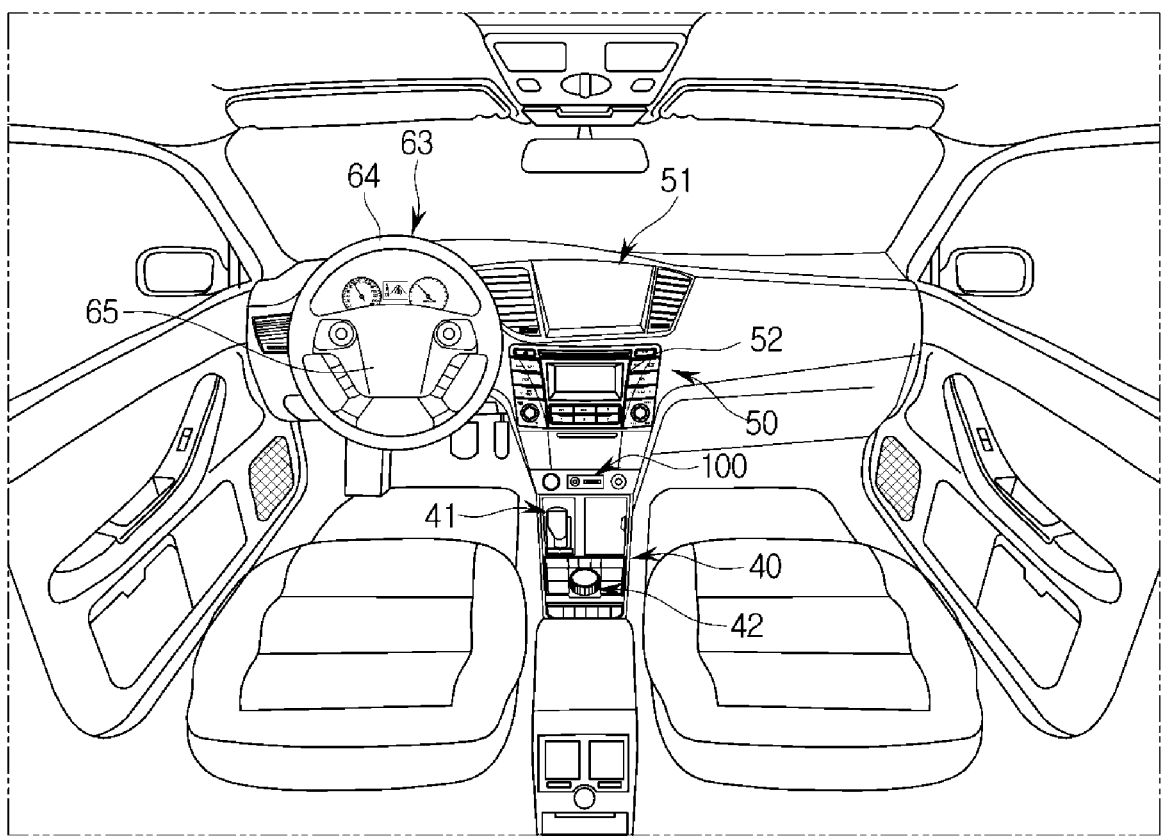
FIG. 2 is a view illustrating an internal structure of a vehicle according to an embodiment of the present disclosure.
Figure 3:
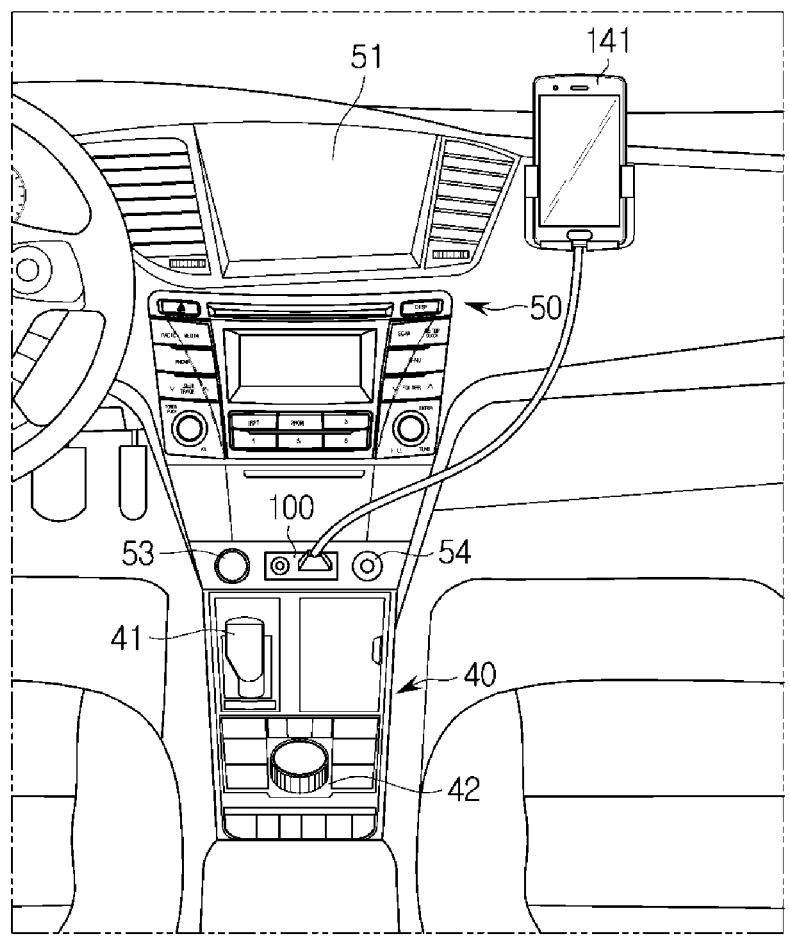
FIG. 3 is a conceptual diagram illustrating a connection between a USB connection port embedded in a vehicle and a host device according to embodiments of the present disclosure.

FIG. 2 is a view illustrating an internal structure of the vehicle according to an embodiment of the present disclosure. FIG. 3 is a conceptual diagram illustrating connection between a USB connection port embedded in a vehicle and a host device.

Referring to FIG. 2, the vehicle 1 may have a dashboard that includes a gearbox 40, a center console (also called a center fascia) 50 and a steering wheel 63, etc.

A gearshift 41 for changing gears may be installed at the gearbox 40. Manipulation unit 42 may allow a user to control a dial manipulation unit 51 for allowing a user to control a navigation device 51 or the principal functions of the vehicle may be installed at the gearbox 40.

The center console 50 may include an air-conditioner, a clock, an audio device 52 and a display 51, etc.

The air conditioner may maintain temperature, humidity, air purity and airflow of indoor air of the vehicle in a comfortable or pleasant condition. The air conditioner may be installed at the center console 50, and may include at least one air outlet through which air is discharged to the outside. A button or dial for controlling the air conditioner, etc. may be installed at the center console 50. A user such as a vehicle driver may control the air conditioner of the vehicle using the button or dial mounted to the center console.

The display 51 may be installed at the center console 50. The display 51 may be embedded in the center console 50 of the vehicle. The display 51 may display various images generated from the audio video navigation (AVN) device 111 (see FIG. 9), which will be described later.

Meanwhile, the display 51 may be implemented by any one of a Liquid Crystal Display (LCD) panel, a Light Emitting Diode (LED) panel, an Organic Light Emitting Diode (OLED) panel, etc., without being limited thereto.

The steering wheel 63 is a device that controls the vehicle wheels (61, 62) and adjusts a traveling direction of the vehicle 1, and may include a rim 64 grasped by a vehicle driver and a spoke 65 to connect the rim 64 to a hub of a rotation axis for steering.

The dashboard may include various instrument panels on which a vehicle traveling speed, a number of revolutions per minute (rpm) of an engine, and a remaining fuel quantity can be displayed, and may further include a glove box in which various goods can be stored.

In addition, a USB port 100 to connect a storage-medium connection device to the AVN device 111 (see FIG. 10) of the vehicle 1 may be installed in the center console 50 of the dashboard. The USB port 100 may be implemented as one of constituent elements installed in the vehicle 1, such that the USB port 100 acting as one constituent element may be installed in the vehicle 1 along with the remaining constituent elements. Alternatively, the USB port 100 may be installed as an independent structure separated from such constituent elements in the vehicle 1 as necessary.

Meanwhile, the AVN device 111 may be a terminal configured to provide not only a navigation function for providing the driver or user with a travel route to the destination, but also audio and video functions.

The AVN device 111 may selectively display at least one of an audio screen image, a video screen image, and a navigation screen image on the display 51. In addition, the AVN device 111 may display various control screen images related to the vehicle 1 or screen images related to additional functions executable by the AVN device 111 on the display 51.

In addition, the AVN device 111 may be connected to a storage-medium connection unit through the USB port 100.

In such a case, the storage medium (or the storage) to store data therein may include various kinds of portable storage media, for example, a USB memory and a memory card (e.g., a Smart Media Card (SMC), a Compact Flash (CF) card, a memory stick, a Secure Digital (SD) card and/or a Multimedia Card (MMC)).

The storage medium which is connectable to the connection device may include a magnetic storage medium (for example, a floppy disk, a hard disk drive (HDD), etc.), an optical storage medium (for example, a CD-ROM, a DVD, etc.), and an electronic device connected to the above-mentioned portable storage medium. In this case, the electronic device may include a magnetic storage medium, an optical reading medium, a computer connectable to the mobile storage medium, a laptop, a digital camera, a smartphone 141, an MP3 player, a Portable Multimedia Player (PMP) and/or a game console, etc.

In more detail, the Secure Digital (SD) card may store navigation map data therein, and may transmit the stored map data to the AVN device 111 through the USB port 100. In addition, a USB memory 122a, iPad/MP3 player, the smartphone 141 etc. may transmit multimedia files stored therein to the AVN device 111.

Since the AVN device 111 may be embedded in the center console, a user may not visually recognize the AVN device 111. However, the AVN device 111 may be controlled by the above-mentioned various Input/Output (I/O) devices.

The USB port 100 may be located at a lower end of the center console 50 in the vehicle 1. The USB port 100 and a connector will hereinafter be described with reference to FIGS. 4A and 4B.

Meanwhile, USB serving as one method for serial communication between a host device and a slave device has been widely used as a popular serial interface between various devices directly connected to each other through a cable, as shown in FIG. 3.

For example, as can be seen from FIG. 3, a user terminal (also called user equipment (UE)) (i.e., the smartphone 141) may be connected to the AVN device 111 through the cable connected to the USB port 100. That is, various media files stored in the smartphone 141 may be transferred to the AVN device 111 through the cable connected to the USB port 100. In this case, the smartphone 141 may serve as the host device, and the AVN device 111 may serve as the slave device.

Figure 4A:
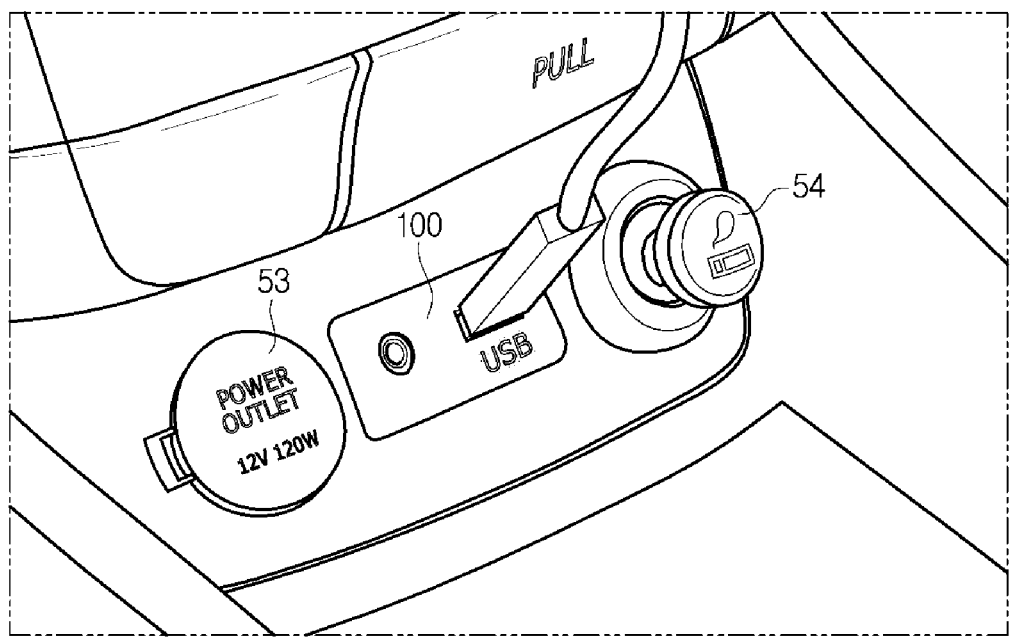
FIG. 4A is an enlarged view illustrating the USB port shown in FIG. 3.
Figure 4B:
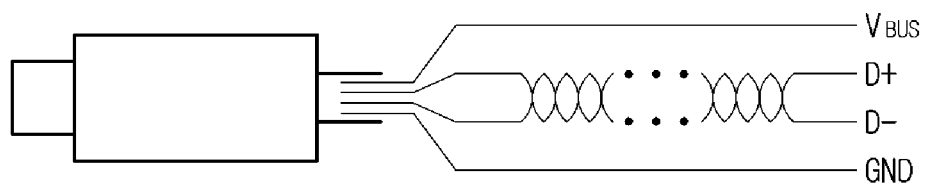
FIG. 4B is a conceptual diagram illustrating a USB cable and a connector according to embodiments of the present disclosure.

FIG. 4A is an enlarged view illustrating the USB port shown in FIG. 3, and FIG. 4B is a conceptual diagram illustrating the USB cable and the connector.

Referring to FIG. 4A, although a power-supply terminal 53 or a cigarette lighter terminal 54 may be installed in the vicinity of the USB port 100 of the center console 50 of the vehicle 1, the scope or spirit of such constituent elements contained in the vehicle 1 is not limited thereto.

Referring to FIG. 4A, the USB memory 122a (see FIG. 10) may be connected to the USB port 100. The USB memory 122a may be connected according to an IEEE standard, and a connection cable and a connection pin needed for such connection will hereinafter be described with reference to FIG. 4B.

Referring to FIG. 4B, the USB cable may be used as a 4-pin communication structure composed of four pins (D+, D−, Vbus, GND).

In such a case, the USB cable may receive a power-supply voltage from the host device through the Vbus pin. Generally, a maximum current capable of being supplied from the host device may be 500 mA, and a maximum voltage capable of being supplied from the host device may be 5V. The GND pin may be a ground line associated with the power-supply voltage.

The D+ and D− pins may be data communication lines, and may be driven by a differential signal. Each of the D+ and D− pins may be longer than the Vbus line, such that the power-supply voltage is first supplied through the Vbus pin when the USB memory 122a is inserted into the USB port. In contrast, if the USB memory 122a is released from the USB port, the signal lines corresponding to the D+ and D− pins may first be severed and supply of the power-supply voltage is then cut off, resulting in protection of the electronic device.

Meanwhile, connection cables and pins for use in the above-mentioned USB may also be based on the IEEE standard.

Figure 5:
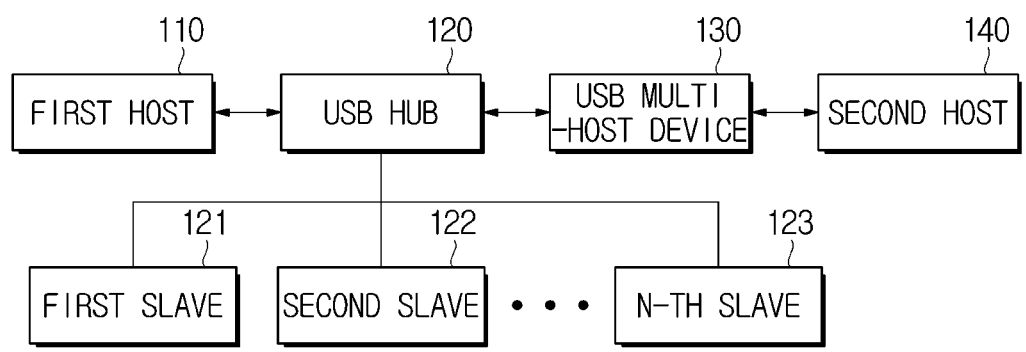
FIG. 5 is a block diagram illustrating a USB data transmission structure according to an embodiment of the present disclosure.

FIG. 5 is a block diagram illustrating a USB data transmission structure according to an embodiment of the present disclosure.

Referring to FIG. 5, a USB connection topology according to one embodiment may include a first host 110, a USB hub 120, a plurality of slave devices (121, 122 and 123) connected to the USB hub 120, a USB multi-host device 130, and a second host 140.

Generally, the host (also called a host device) for use in a USB system may function as the center part of all USB connections, and may be generally referred to as a USB host controller implemented by hardware. A plurality of host devices, i.e., a first host 110 and a second host 140, are shown in FIG. 5.

The host device may have all responsibility and authority with respect to the coupled device (i.e., the slave device 121). The host device may assign the authority to access the USB bus to the slave device. The host needs to monitor USB topology at all times, and may prevent access of other devices having no authority.

Meanwhile, the host device for use in the vehicle 1 may be identical to the AVN device 111. The AVN device 111 may be connected to the plurality of slave devices (121, 122, 123) installed in the vehicle 1.

In FIG. 5, the USB hub 120 may connect the first host 110 to the slave devices (121, 122 and 123). That is, the USB hub 120 may allow a plurality of slave devices to simultaneously use a single output signal of the first host 110 (i.e., the USB host controller).

In this case, each of the slave devices (121, 122 and 123) may be used as a storage-medium connection device. The storage-medium connection device may include various connection devices, for example, the USB memory 122a, or the smartphone 141, etc.

If the AVN device 111 is connected to the USB memory 122a through the USB port 100, the first host 110 may be set to the AVN device 111 and the first slave 121 may be set to the USB memory 122a.

In addition, the AVN device 111 may have all responsibility and authority with respect to the USB memory 122a, and may have authority to access multimedia files stored in the USB memory.

The above-mentioned master-slave principle for the USB system may implement a simplified USB specification. That is, due to the asymmetrical structure master-slave structure, the USB port 100 includes only four pins (D+, D−, Vbus, GND) as described above.

Korean Patent Publication No. KR-2008-0102355A has disclosed a conventional art in which, when several hosts are connected, a separate physical pipe needed for such connection is installed, such that a slave device may be connected to each host through an internal structure configured to cope with a request of each host.

In other words, assuming that a plurality of hosts is present, it is impossible for the respective hosts to be connected through only one USB port 100, and a new physical structure (for example, a pipe or another USB port 100) may be additionally needed.

However, whereas the above-mentioned scheme implements simultaneous communication between the plurality of hosts and the slaves, it may still be impossible to implement communication between the plurality of hosts.

Assuming that the first host 110 and the second host 140 are connected to each other according to the conventional USB topology, if the first host 110 transmits data, the second host 140 must operate as the slave. In contrast, if the second host 140 transmits data, the first host 110 must operate as the slave.

In other words, assuming that the first host 110 operates as the slave, the first host 110 may lose the authority to control the plurality of slaves (121, 122 and 123) controlled by the USB hub 120.

For example, assuming that the first host 110 is the AVN device 111 and the second host 140 is the smartphone 141 of the user, the AVN device 111 may lose the authority to control other slave devices of the vehicle 1 when the smartphone 141 operates as the host.

In order to address the above-mentioned issues, one example of the embodiment of the present disclosure may include the USB multi-host device 130.

In this case, assuming that the first host 110 operates as the master for the second host 140, the USB multi-host device 130 may allow the second host 140 to operate as if it were a slave. In addition, assuming that the second host 140 operates the master for the first host 110, the USB multi-host device 130 may allow the first host 110 to operate as if it were a slave.

That is, the USB multi-host device 130 may operate as a protocol converter configured to interconnect the plurality of hosts without adding a physical pipe or the USB port 100.

The operation and logical structure of the USB multi-host device 130 will hereinafter be described with reference to the attached drawings.

Figure 6:
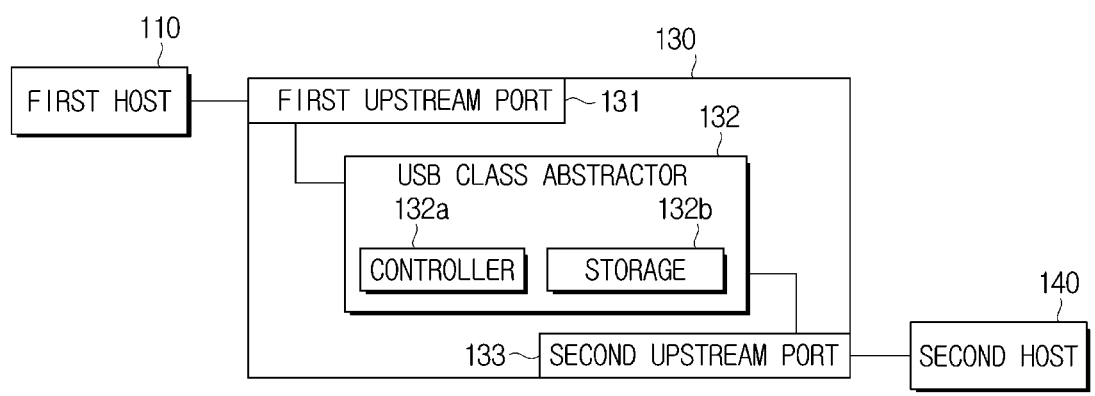
FIG. 6 is a block diagram illustrating a USB multi-host device according to an embodiment of the present disclosure.

FIG. 6 is a block diagram illustrating a USB multi-host device according to an embodiment of the present disclosure.

Referring to FIG. 6, the USB multi-host device 130 (i.e., the protocol converter) may include a first upstream port 131 connected to the first host, a second upstream port 133 connected to the second host, and a USB class abstractor 132 that includes not only a universal controller 132a to control/perform overall operations but also a storage 132b to process/store various kinds of information.

In more detail, the first upstream port 131 may be a port that is physically connected to the first host 110.

In comparison with FIG. 5, the USB multi-host device shown in FIG. 6 may further include a USB hub 120 disposed between the first host 110 and the first upstream port 131.

Likewise, the second upstream port 133 may be a port that is physically connected to the second host 140.

Although FIG. 6 has exemplarily disclosed the first host 110 and the second host 140 for convenience of description, the USB multi-host device 130 may be connected to two or more host devices, such that the USB multi-host device 130 may include a plurality of upstream ports.

The USB Class Abstractor 132 may operate as a core designed to control an overall operation of the USB multi-host device 130.

In more detail, the controller 132 may control the USB multi-host device 130 to serve as the slave as described above. In addition, the controller 132 may be integrated into a System On a Chip (SOC), and may be driven by the processor.

The operations of the controller 132 will be described later with reference to FIGS. 7A and 7B.

The storage 132b may denote a memory that stores not only processed information from among various operations of the controller 132a, but also executable code. That is, storage 132b may be configured as a storage medium implemented by hardware, for example, a Random Access Memory (RAM), a Static Random Access Memory (SRAM), a Read Only Memory (ROM), an Electrically Erasable Programmable Read Only Memory (EEPROM), a Programmable Read Only Memory (PROM), etc. In addition, the storage 132b may include both a non-volatile memory and a volatile memory as necessary.

Meanwhile, the USB multi-host device 130 may include the above-mentioned hardware structures and other physical constituent elements easily appreciated by those skilled in the art, the scope or spirit of the USB multi-host device 130 is not limited thereto, and other modifications may also be applied thereto as necessary.

Figure 7A:
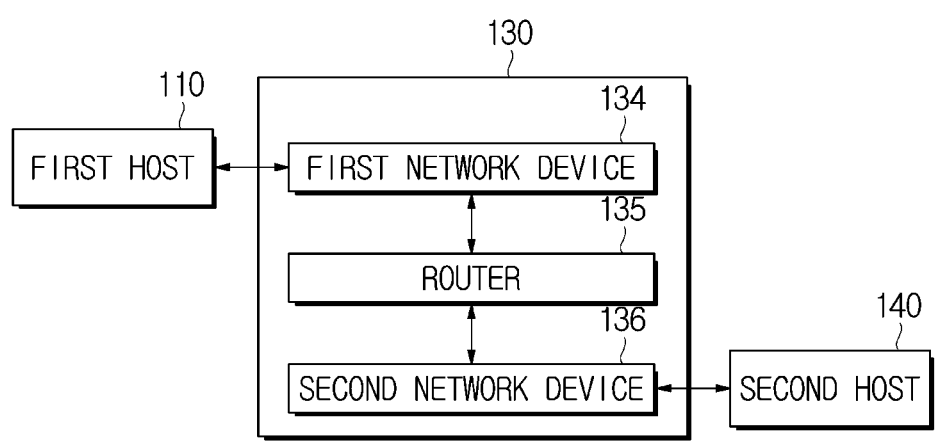
FIGS. 7A and 7B are block diagrams illustrating a data transmission structure of a USB multi-host device according to embodiments of the present disclosure.
Figure 7B:
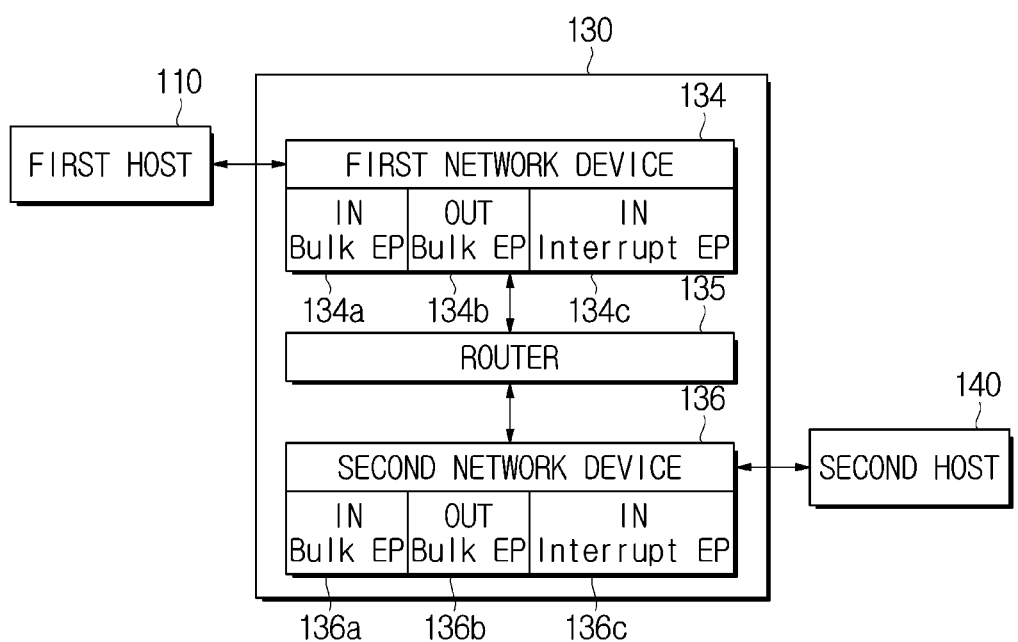

FIGS. 7A and 7B are block diagrams illustrating a data transmission structure of a USB multi-host device according to an embodiment of the present disclosure. In other words, FIGS. 7A and 7B may denote various structures expressed by logical circuits, instead of physical constituent elements.

Referring to FIG. 7A, the USB multi-host device 130 may include a first network device 134, a router 135 and a second network device 136, which may be implemented by software.

Each of the network devices (134, 136) may indicate a logical interface, and may be configured as at least one end point (EP) as shown in FIG. 7B.

In more detail, the USB multi-host device 130 may be connected to a buffer of the host and each end point (EP), such that the USB multi-host device 130 may request data from or transmit data to the buffer and the end point (EP). In more detail, the USB multi-host device 130 may packetize data, may upload the packetized data to the end point (EP), and may adjust the bus, resulting in the formation of a communication flow.

The one end point is a terminal of the communication flow, such that each EP may have a unique ID and may be present in the logical network device. In addition, the end point (EP) may be assigned a unique number within a predetermined time, and may have information regarding the destination of data. Information related to data transmission of the end point (EP) will hereinafter be described with reference to FIG. 7B.

If three or more hosts are connected to the router 135, the router 135 may be used to identify a destination configured to receive data from the USB multi-host device 130.

Generally, although a general router may denote the Internet networking device configured to interconnect a local area network (LAN) and the other LAN as well as to interconnect a LAN and a wide area network (WAN), the router 135 may denote a logical device configured to identify a destination of data by software.

Referring to FIG. 7B, the network device 134 may include an IN Bulk EP 134a, an OUT Bulk EP 134b and an IN Interrupt EP 134c. The network device 136 may include an IN Bulk EP 136a, an OUT Bulk EP 136b and an IN Interrupt EP 136c.

As described above, the USB system interface may be comprised of a set (or aggregate) of the end points (EPs). In other words, the USB class abstractor 132 may support a Network Device Class.

Therefore, the USB class abstractor 132 may generate the set (or aggregate) of the end points (EPs) by software, such that the host may be recognized as the network device through the set of EPs. In FIG. 7B, the USB class abstractor 132 may generate at least one network device (134, 136) by software, such that the host may recognize the USB multi-host device 130 as the slave device.

Meanwhile, the terms "IN" and "OUT" contained in the IN Bulk EPs (134a, 136a), the OUT Bulk EPs (134b, 136b) and the IN Interrupt EPs (134c, 136c) may denote flow and direction of data on the basis of the host.

The terms "IN" and "OUT" may be determined on the basis of the host. In other words, the term "IN" may denote the direction for transmitting data from the slave to the host, and the term "OUT" may denote the direction for transmitting data from the host to the slave.

Therefore, the IN Bulk EP 134a of the logical network device 134 may denote the end point (EP) through which the slave device (i.e., the USB multi-host device 130) may store data in the first host 110 and transmit data to the first host 110. The IN Bulk EP 136a of the logical network device 135 may denote the end point (EP) through which the slave device (i.e., the USB multi-host device 130) may store data in the second host 140 and transmit data to the second host 140.

The OUT Bulk EP 134b of the logical network device 134 may denote the end point (EP) through which the first host 110 may store data in the USB multi-host device 130 and transmit data to the USB multi-host device 130. The OUT Bulk EP 136b of the logical network device 136 may denote the end point (EP) through which the second host 140 may store data in the USB multi-host device 130 and may transmit data to the USB multi-host device 130.

Meanwhile, data transmission may indicate that the network device may transmit packets defined in the IEEE 802.3 standard. In this case, the packet size (i.e., the size of transmission data) may be denoted by any of various terms (i.e., Bulk, Isochronous and/or Interrupt).

In more detail, the packet size denoted by "Bulk" may be devised to correctly transmit a relatively large amount of data, irrespective of time. In addition, the packet size denoted by "Bulk" may retransmit data when a transmission error occurs in the bus. Therefore, the IN Bulk EPs (134a, 136a) and the OUT Bulk EPs (134b, 136b) may be used to transmit and receive relatively large-sized data.

The packet size denoted by "Interrupt" may be devised to transmit and receive small data aperiodically, may guarantee a service period (or a service cycle), and may be in charge of reattempting or the like of data transmission to be executed in a subsequent period caused by errors of the bus.

The logical network device 134 of the USB multi-host device 130 may include the IN Interrupt EP 134c, and the logical network device 136 of the USB multi-host device 130 may include the IN Interrupt EP 136c.

As described above, the slave for use in the USB system is unable to first transmit data according to the master-slave principle. Therefore, the USB multi-host device 130 may serve as the slave such that the plurality of hosts may communicate with each other through the USB multi-host device 130.

That is, the USB multi-host device 130 acting as the slave may transmit a signal indicating the presence or absence of data to the host scheduled to receive data through the IN Interrupt EP 134c or 136c. That is, assuming that the IN Interrupt EP 134c or 136c transmits a signal for data acquisition to the host, the host may receive data through the IN Bulk EP 134a or 136a.

As a result, the plurality of hosts may not serve as the slave devices, and may communicate with each other through the USB multi-host device 130.

Meanwhile, the logical network device 134 or 136 according to one embodiment of the present disclosure may include not only the above-mentioned end point (EP) but also an isochronous end point (EP), without being limited thereto.

Figure 8:
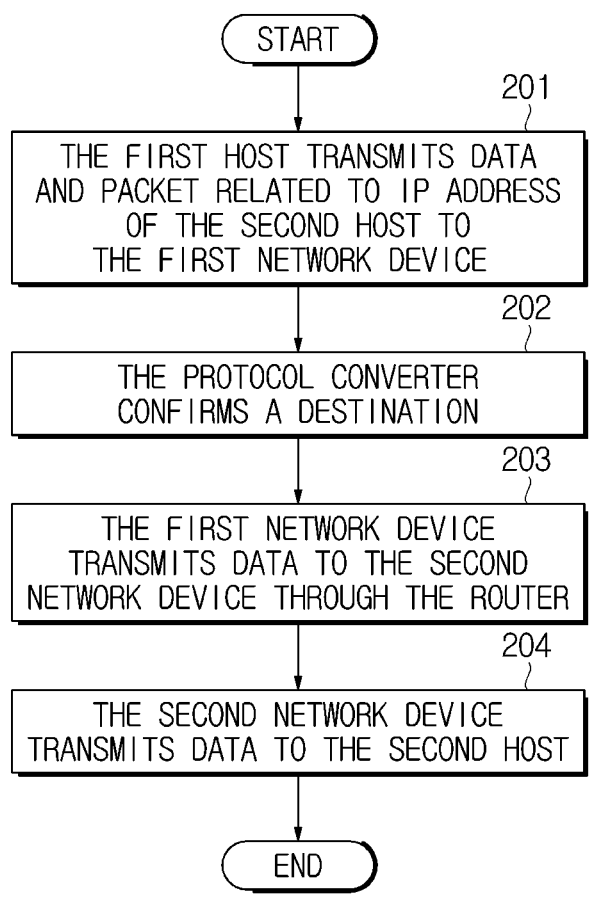
FIG. 8 is a flowchart illustrating a method for controlling a USB multi-host device according to an embodiment of the present disclosure.

FIG. 8 is a flowchart illustrating a method for controlling the USB multi-host device according to an embodiment of the present disclosure.

Referring to FIG. 8, the first host 110 may transmit data to the second host 140 through the USB multi-host device 130.

In more detail, the first host 110 may transmit packets and data related to the IP address of the second host 140 to the first network device 134 in operation 201.

As described above, the first network device 134 may be a software structure generated by the USB class abstractor 132, but not the hardware structure. Meanwhile, the end point (EP) configured to receive data from the first network device 134 will hereinafter be described with reference to FIG. 9.

Upon completion of data reception, the controller 132a of the USB multi-host device 130 may confirm a destination of data through a packet in operation 202.

The destination may be the slave device (121, 122 and/or 123) or the second host 140. If the destination is any one of the slave devices, the USB multi-host device may be scheduled to transmit data according to general USB topology.

If the destination is the second host 140, the first network device 134 may transmit data to the second network device 136 through the router 135 in operation 203.

Such data transmission may not indicate physical data transmission, and may be logically determined through the USB class abstractor 132.

The second network device 136 may transmit data to the second host 204 in operation 204.

That is, according to the general master-slave principle, the first host 110 may not transmit data to the second host 140. If the first host 110 is scheduled to transmit data, the second host 140 must be switched to the slave device, and the second host 140 may lose the right to use other slave devices or the like.

However, the USB multi-host device 130 may operate as the slave device, such that the second host 140 may operate as the host device and at the same time may receive data from the first host 110 through the USB multi-host device 130.

Figure 9:
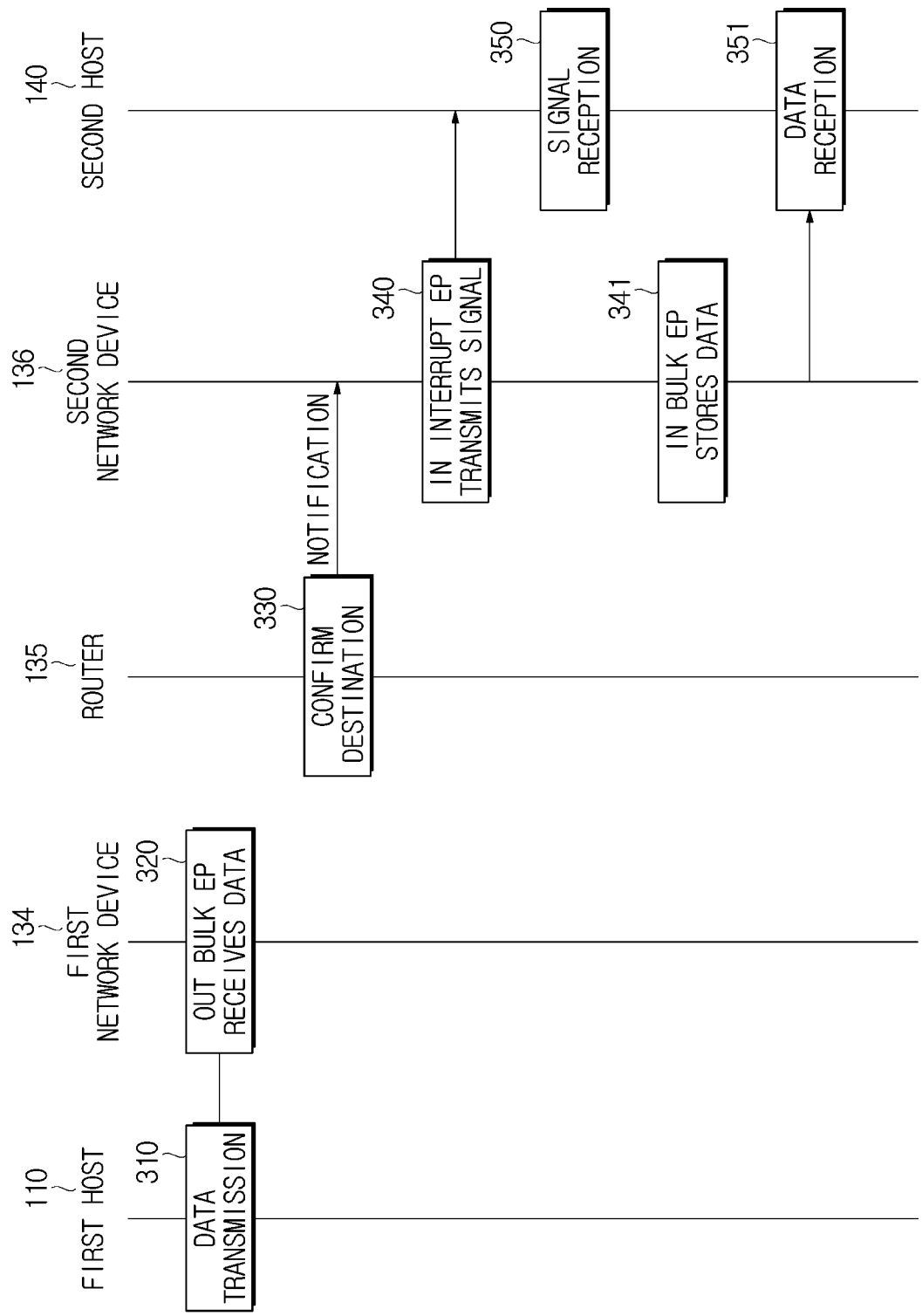
FIG. 9 is a flowchart illustrating operations shown in FIG. 8.

FIG. 9 is a flowchart illustrating the operations shown in FIG. 8.

Referring to FIG. 9, the first host 110 may transmit data in operation 310, and the first network device 134 may receive the data from the first host 110 in operation 320.

In more detail, the OUT Bulk EP 134b of the first network device 134 may receive data. As can be seen from FIG. 7B, "OUT" may denote the direction for transmitting data from the host to the slave, and "Bulk" may be used for data reception. Therefore, the OUT Bulk EP 134b of the first network device 134 may receive data from the first host 110. Upon completion of data reception, the USB multi-host device 130 may confirm a destination in operation 330. That is, the router 135 of the USB multi-host device 130 may confirm the destination at which data is received. If the destination is the second host 140, the router 135 may inform the second network device 136 of the second host 140 acting as the destination.

In the meantime, functions and operations of the router 135 may be physically implemented by the controller 132a (i.e., the core), and the router 135 may not always transmit commands or may not always transmit data.

The second network device 136 may transmit a signal for data acquisition to the second host 140 in operation 340.

In more detail, the IN Interrupt EP 136c of the second network device 136 may transmit a signal. In this case, "IN" may denote the host direction on the basis of the slave, and "Interrupt" may denote the end point (EP) to transmit and receive small data aperiodically. Therefore, the second network device 136 may transmit a signal indicating the presence of data to be transmitted from the second host 140 through the IN Interrupt EP 136c.

If the second host 140 receives a signal in operation 350, the second host 140 may receive data from the network device 136 according to the master-slave principle.

That is, the USB multi-host device 130 may transmit data to the second host 140 according to a control signal of the second host 140.

In more detail, the second network device 136 may store data received from the first host 110 in the IN Bulk EP 136a. In this case, the term "IN" may denote the host direction on the basis of the slave, and the Bulk end point (EP) may be used to transmit a large amount of data.

That is, the second host may receive data through the IN Bulk EP 136a of the second network device 136 in operation 351.

As a result, the USB multi-host device may use the conventional USB standard, and at the same time may implement communication between the plurality of hosts, such that the host and the slave device constructing the conventional topology may communicate with each other.

In addition, other host devices may communicate with several slave devices through the single USB port 100, such that the plurality of USB ports 100 need not be installed and the number of high-priced cables needed to install the plurality of USB ports 100 may be greatly reduced.

In order to describe the above-mentioned effects in more detail, as can be seen from FIG. 10, the USB multi-host device may be installed in and applied to the vehicle 1, and a detailed description thereof will hereinafter be given with reference to FIG. 10.

Figure 10:
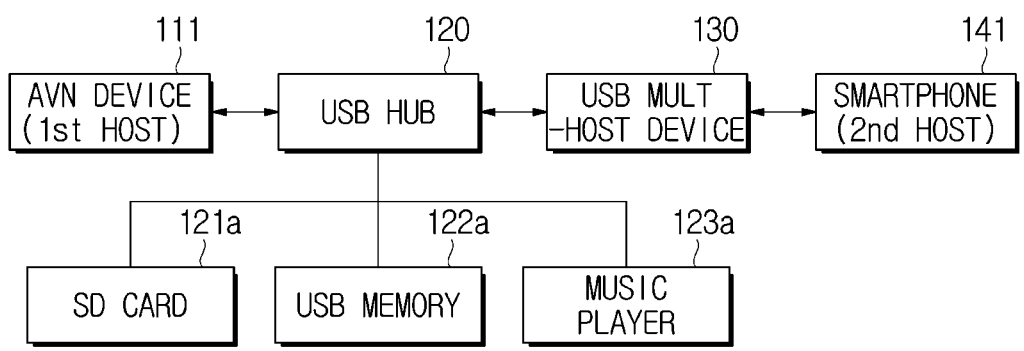
FIG. 10 is a conceptual diagram illustrating a method for installing a USB multi-host device in the vehicle and an application method of the USB multi-host device according to an embodiment of the present disclosure.

FIG. 10 is a conceptual diagram illustrating a method for installing the USB multi-host device in the vehicle and an application method of the USB multi-host device according to an embodiment of the present disclosure.

Referring to FIG. 10, a vehicle driver who rides in the vehicle 1 may connect the smartphone 141 to the AVN device 111 through the USB port 100.

Before the user connects the smartphone 141 to the AVN device 111, the AVN device 111 may operate as the host for the other slave device (e.g., a Secure Digital (SD) card 121a, the USB memory 122a, and the music player 123a). In this case, the smartphone 141 of the user may operate as the host, and may transmit the multimedia file to the AVN device 111. In this case, the AVN device 111 may operate as the slave according to the master-slave principle of USB.

If the USB multi-host device 130 is not present, the AVN device 111 may operate as the slave device such that the AVN device is unable to communicate with the plurality of slave devices shown in FIG. 10.

However, assuming that the USB multi-host device according to one embodiment is installed in the vehicle 1, the USB multi-host device 130 may operate as if it were the slave device connected to the smartphone 141.

Therefore, assuming that the smartphone 141 transmits data to the AVN device 111, the USB multi-host device 130 instead of the AVN device 111 transmits data, such that the AVN device 111 may maintain the host function for other slave devices. As a result, the vehicle 1 including the USB multi-host device may support a plurality of USB slave devices without installation of the other USB port 100 and additional high-priced cables.

As is apparent from the above description, the USB multi-host device, the vehicle including the same, and the method for controlling the USB multi-host device according to the embodiments of the present disclosure can execute a conversion function by software so as to support On the Go (OTG) in which a plurality of hosts can communicate with each other according to the USB communication standard, such that hardware complexity of a host system is reduced and the number of high-priced cables and complicated connections contained in a vehicle or the like is greatly reduced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A universal serial bus (USB) multi-host device comprising:
 a plurality of upstream ports connected to a first host, a second host, and a slave device;

a storage for storing data to be transmitted from the first host to the second host through the upstream ports; and a controller, and if the storage receives the data, the controller transmitting a signal informing the second host that the first host has data to be transmitted to the second host based on the received data to the second host through an IN interrupt end point, and transmitting the stored data to the second host, wherein the controller controls the USB multi-host device to serve as a slave of the first host and the second host such that the first host and the second host maintain a host function for the slave device while the controller is transmitting the stored data to the second host.

2. The USB multi-host device according to claim 1, wherein if there is a plurality of hosts, the controller determines a host scheduled to transmit the data on the basis of the received data.

3. The USB multi-host device according to claim 1, wherein the controller transmits a predefined packet in such a manner that each of the first host and the second host recognizes the controller as a logical network device.

4. The USB multi-host device according to claim 1, wherein the controller allows the first host to transmit the data to the storage through an OUT Bulk end point.

5. The USB multi-host device according to claim 1, wherein if the data is transmitted to the second host, the controller transmits the data to the second host through the IN Bulk end point.

6. A vehicle including a universal serial bus (USB) multi-host device, the USB multi-host device comprising:

a plurality of upstream ports connected to a first host, a second host, and a slave device;

a storage for storing data to be transmitted from the first host to the second host through the upstream ports; and a controller, and if the storage receives the data, the controller transmits a signal informing the second host that the first host has data to be transmitted to the second host based on the received data to the second host through an IN interrupt end point, and transmits the stored data, to the second host, wherein the controller controls the USB multi-host device to serve as a slave of the first host and the second host such that the first host and the second host maintain a host function for the slave device while the controller is transmitting the stored data to the second host.

7. The vehicle according to claim 6, wherein if there is a plurality of hosts, the controller determines a host scheduled to transmit the data on the basis of the received data.

8. The vehicle according to claim 6, wherein the controller transmits a predefined packet in such a manner that each of the first host and the second host recognizes the controller as a logical network device.

9. The vehicle according to claim 6, wherein the controller allows the first host to transmit the data to the storage through an OUT Bulk end point.

10. The vehicle according to claim 6, wherein if the data is transmitted to the second host, the controller transmits the data to the second host through the IN Bulk end point.

11. A method for controlling a universal serial bus (USB) multi-host device comprising:

storing data to be transmitted from a first host to a second host;

transmitting a signal informing the second host that the first host has data to be transmitted to the second host based on the transmitted data to the second host through an IN interrupt end point;

transferring the stored data to the second host; and controlling the USB multi-host device to serve as a slave of the first host and the second host such that the first host and the second host maintain a host function for a slave device while transferring the stored data to the second host.

12. The method according to claim 11, wherein:

if there is a plurality of hosts, determining a host scheduled to transmit the data on the basis of the data.

13. The method according to claim 11, wherein the step of transmitting the signal based on the transmitted data to the second host includes transmitting a predefined packet to the first host and the second host.

14. The method according to claim 11, wherein the step of transferring the stored data to the second host includes transmitting, by the first host, the data through an OUT Bulk end point.

15. The method according to claim 11, wherein the step of transferring the stored data to the second host includes if the data is transmitted to the second host.

* * * * *